United States Patent [19]

Makofka et al.

[11] Patent Number: 5,100,061
[45] Date of Patent: Mar. 31, 1992

[54] FLOOR MOUNTING ARRANGEMENT FOR MANURE SPREADERS

[75] Inventors: Stanley J. Makofka; Larimer J. Knepper, both of New Holland, Pa.

[73] Assignee: Ford New Holland, Inc., New Holland, Pa.

[21] Appl. No.: 670,642

[22] Filed: Mar. 18, 1991

[51] Int. Cl.$^5$ .................................................. A01C 3/06
[52] U.S. Cl. ................................. 239/679; 239/650; 239/672
[58] Field of Search ................ 239/650, 672, 679; 198/735.3

[56] References Cited

U.S. PATENT DOCUMENTS

| | | | |
|---|---|---|---|
| 3,136,556 | 6/1964 | Wilkes et al. | 239/679 |
| 4,205,792 | 6/1980 | Horst et al. | 198/735.3 |
| 4,222,482 | 9/1980 | Kelley | 198/735.3 |
| 4,394,976 | 7/1983 | Rae | 239/679 |

Primary Examiner—Andres Kashnikow
Assistant Examiner—Karen B. Merritt
Attorney, Agent, or Firm—Larry W. Miller; Frank A. Seemar

[57] ABSTRACT

A manure spreader includes a box carried by a base frame for holding and transporting manure. The box has a floor made up of a plurality of individual boards preferably formed of plastic material such as polyethylene. A conveyor moves manure along the floor toward one end of the box where a distributor mechanism is mounted. Clips fastened to rearward ends of the floor boards slidably engage a cross frame member of the base frame, and an end cap slidably receives forward ends of the floor boards. Fasteners such as bolts securely fasten the floor boards to the base frame intermediate their forward and rearward ends. The clips and the end cap permit lengthwise expansion and contraction of the floor boards to insure that the floor maintains an even surface for the conveyor to travel across.

12 Claims, 2 Drawing Sheets

FLOOR MOUNTING ARRANGEMENT FOR MANURE SPREADERS

BACKGROUND OF THE INVENTION

This invention relates generally to manure spreaders and, in particular, to a floor mounting arrangement for manure spreaders.

U.S. Pat. No. 4,205,792 to Horst et al discloses an agricultural machine typically referred to as a box type manure spreader with a box for holding and transporting manure. This box has a floor made up of a plurality of individual boards extending lengthwise thereof. A conveyor consisting of slats extending transversely of the floor between a pair of spaced apart endless chains serves to move manure along the floor toward an open end of the box where a distributor mechanism is mounted. The distributor mechanism distributes the manure onto a field as the spreader is pulled by a tractor. U.S. Pat. No. 4,394,976 to Rae discloses another box type manure spreader having a hydraulically operated, push-off wall instead of a conveyor for moving manure along the floor of the box.

In manure spreaders of the box type, the individual boards forming the floor have usually been made of a wooden material. Wooden boards function well in normal conditions but they are vulnerable to damage from foreign objects. It is also difficult to consistently manufacture high quality wooden boards. Recently, plastic material has been used in forming floor boards for box type manure spreaders. Although plastic floor boards overcome the afore-mentioned problems encountered with wooden floor boards, they have a relatively high coefficient of expansion which results in a significant amount of expansion and contraction, especially in the lengthwise direction of the floor boards. If plastic floor boards are securely fastened at their ends, this expansion and contraction causes them to buckle resulting in an uneven surface for the slats of the conveyor to travel across.

SUMMARY OF THE INVENTION

It is an object of the present invention to provide an arrangement for mounting a floor in a box type manure spreader which permits lengthwise expansion and contraction of the floor to insure that the floor maintains an even surface.

Another object of the present invention is to provide an arrangement for mounting a floor in a box type manure spreader that permits easy replacement of individual boards which make up the floor.

A manure spreader according to the present invention comprises a box carried by a base frame for holding and transporting manure. The box has a floor preferably made up of a plurality of individual boards with each floor board having a forward end and a rearward end. The manure spreader also comprises means for moving manure along the floor toward one end of the box, means disposed adjacent the one end of the box for distributing manure onto a field, and means mounting the forward and rearward ends of the floor boards to the base frame. The floor board mounting means permits movement of the forward and rearward ends of the floor boards in generally horizontal directions while preventing movement of the forward and rearward ends of the floor boards in generally vertical directions.

In the preferred embodiment of the present invention, the floor board mounting means comprises clips fastened to the rearward ends of the floor boards for slidable engagement with the base frame of the spreader, an end cap slidably receiving the forward ends of the floor boards, and fasteners securely fastening the floor boards to the spreader base frame intermediate their forward and rearward ends. The clips have flange portions which are slidably engaged with a cross frame member of the spreader base frame, and the end cap has a portion which defines a pocket slidably receiving the forward ends of the floor boards.

DESCRIPTION OF THE PREFERRED EMBODIMENT

Figure 1:
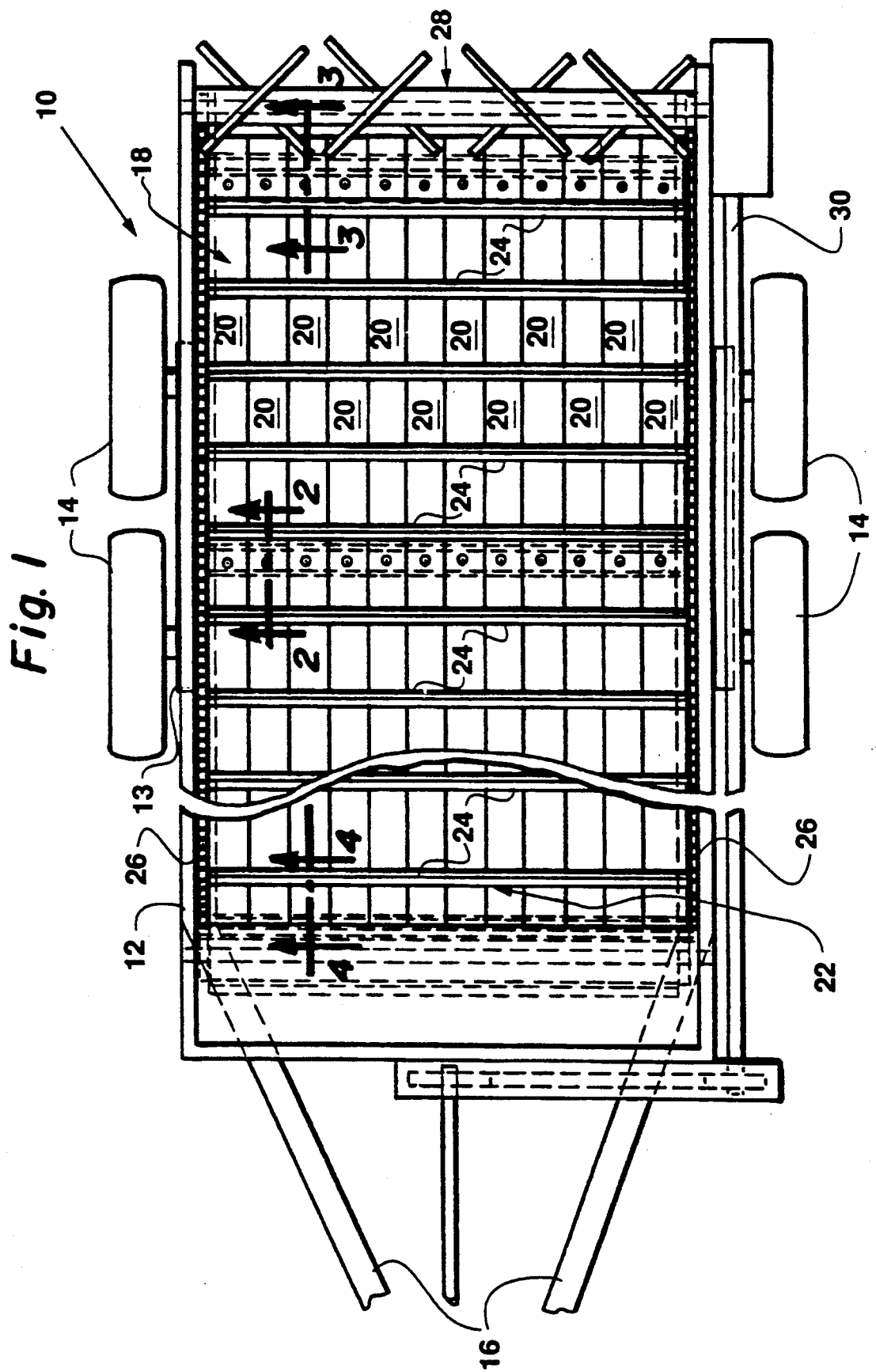
FIG. 1 is a top plan view of a manure spreader incorporating a floor mounting arrangement according to the present invention.

Referring to FIG. 1, a manure spreader 10 includes a generally rectangular box 12 carried by a base frame 13 and supported by wheels 14 for holding and transporting manure. A tongue 16 extends forwardly from the box 12 for connection to a tractor (not shown). The box 12 has a floor 18 made up of a plurality of individual boards 20 formed of plastic material such as high density polyethylene. A conveyor 22 consisting of a plurality of slats 24 extending transversely of the floor 18 between a pair of spaced apart endless chains 26 moves manure rearwardly along the floor 18 toward a distributor mechanism 28 mounted adjacent an open end of the box 12. Alternatively, the conveyor 22 may be replaced by a hydraulically operated, push-off wall as shown in U.S. Pat. No. 4,394,976. A drive shaft 30 causes rotation of the distributor mechanism 28 which distributes manure onto a field as the spreader 10 is pulled by a tractor.

Figure 2:
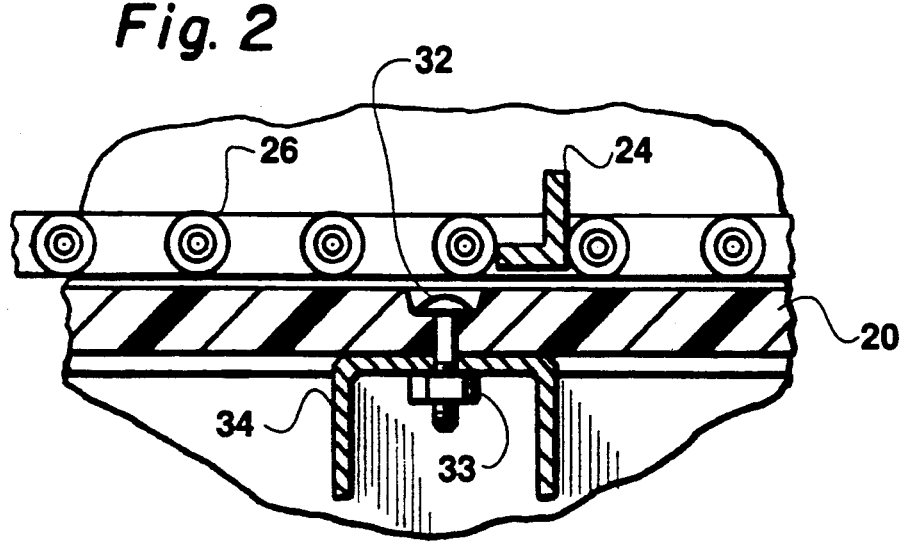
FIG. 2 is an enlarged sectional view taken on lines 2—2 of FIG. 1.
Figure 4:
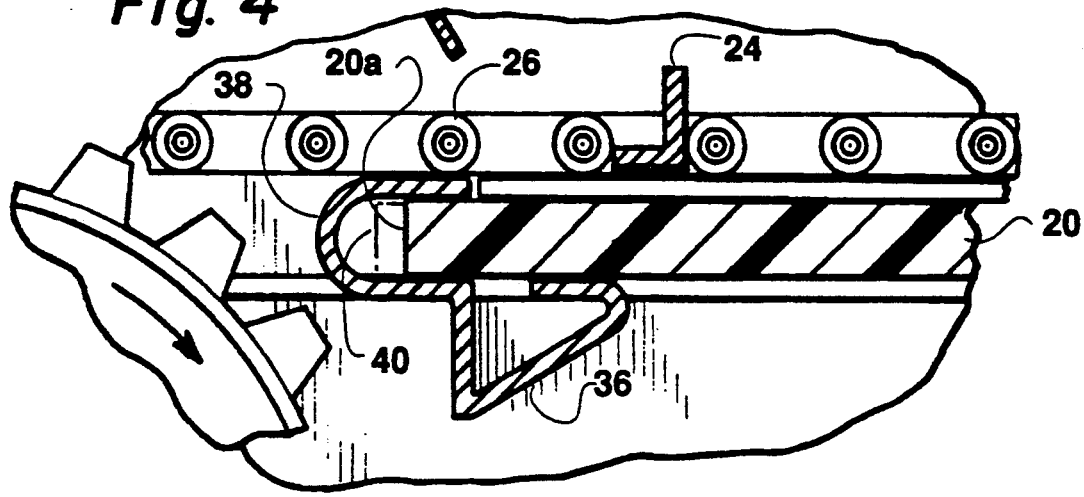
FIG. 4 is an enlarged sectional view taken on lines 4—4 of FIG. 1.

As seen in FIG. 2, the floor boards 20 are each securely fastened intermediate their ends by a fastener such as a bolt 32 and a nut 33 to a cross frame member 34 of the spreader base frame 13. The forward ends 20a floor boards 20 are retained by an end cap 36 as shown in FIG. 4 which extends transversely of the box 12 below upper runs of the chains 26. The end cap 36 is mounted on the base frame 13 and is similar to the end cap disclosed in U.S. Pat. No. 4,205,792 with an upper portion 38 which defines a pocket 40 for slidably receiving the forward ends 20a of the floor boards 20.

Figure 3:
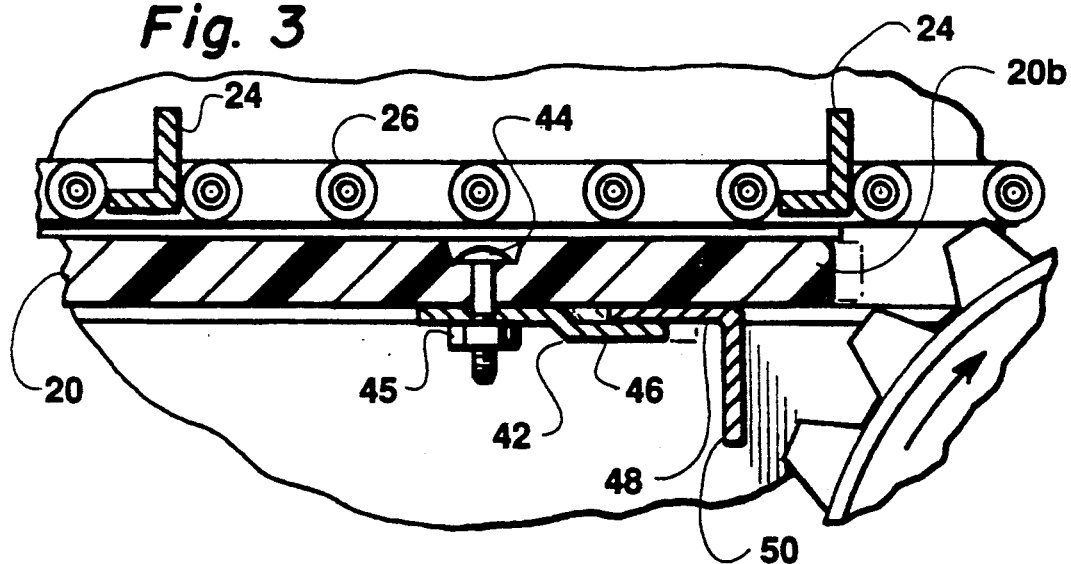
FIG. 3 is an enlarged sectional view taken on lines 3—3 of FIG. 1.

Referring to FIG. 3, the rearward ends 20b of the floor boards 20 each have a clip 42 fastened thereto by a bolt 44 and a nut 45. Each clip 42 has a flange portion 46 slidably engaged with a horizontal flange 48 on a cross frame member 50 of the spreader base frame 13. The slidable engagement between the clips 42 and the cross frame member 50 prevents movement of the floor board rearward ends 20b in a vertical direction while permitting movement of the floor board rearward ends 20b in a horizontal direction.

When the spreader 10 is subjected to temperatures below 70 degrees Fahrenheit, the floor boards 20 contract in length. Conversely, when the spreader 10 is subjected to temperatures above 70 degrees Fahrenheit, the floor boards 20 expand in length. The amount of lengthwise expansion and contraction of the floor boards 20 is approximately equal to 0.00007 inches per foot per Fahrenheit degree. For example, if the floor boards 20 each have a length of 15 feet, they will contract or expand 0.001 inch in length for every degree below or above 70 degrees Fahrenheit. This means that the length of the floor boards 20 will contract about 0.30 inch when the temperature drops to 40 degrees Fahrenheit and about 0.60 inch when the temperature drops to 10 degrees Fahrenheit. The length of the floor boards 20 will expand about 0.30 inch if the temperature rises to 100 degrees Fahrenheit.

The end cap 36 and the clips 42 have been designed to accommodate the most extreme cases of floor board expansion and contraction. Since the floor boards 20 are securely fastened by the bolts 32 intermediate their ends, any lengthwise floor board expansion or contraction results in movement of the forward and rearward floor board ends 20a, 20b in generally horizontal directions. Such movement of the floor board forward ends 20a is permitted by the pocket 40 in the end cap 36 while preventing movement of the floor board forward ends 20a in generally vertical directions. Horizontal movement of the floor board rearward ends 20b is permitted by the slidable engagement between clips 42 and the cross frame member 50. During lengthwise expansion and contraction of the floor boards 20, the flange portions 46 of clips 42 remain engaged with the flange 48 of the cross frame member 50 to prevent vertical movement of the floor board rearward ends 20b.

In an alternative embodiment of the present invention (not shown), the end cap 36 and the clips 42 are replaced with a non-rigid adhesive which secures the forward and rearward ends 20a, 20b of the floor boards 20 to cross frame members of the base frame 13. The floor boards 20 are securely fastened intermediate their ends to the cross frame member 34 by the bolts 32 and nuts 33. The non-rigid adhesive allows lengthwise expansion and contraction of the floor boards 20 in horizontal directions.

It will be understood that the floor mounting arrangement of the present invention may be used on the manure spreader shown in U.S. Pat. No. 4,205,792 or on the manure spreader shown in U.S. Pat. No. 4,394,976.

What is claimed is:

1. A manure spreader comprising:
a box carried by a base frame for holding and transporting manure, said box having a floor with forward and rearward ends;
means for moving manure along said floor toward one end of said box;
means disposed adjacent said one end of said box for distributing manure onto a field;
means for mounting the forward and rearward ends of said floor to said base frame, said floor mounting means permitting movement of the forward and rearward ends of said floor in generally horizontal directions while preventing movement of the forward and rearward ends of said floor in generally vertical directions, said floor mounting means including clip means fastened to the rearward end of said floor, said clip means having a flange portion which is slidably engaged with a cross frame member of said base frame.

2. The manure spreader of claim 1, wherein said floor is made up of a plurality of individual boards with each floor board having a forward end and a rearward end.

3. The manure spreader of claim 2, wherein said floor boards are formed of plastic material.

4. The manure spreader of claim 2, wherein said clip means comprises individual clips fastened to the rearward ends of said floor boards, each said individual clip having said flange portion which is slidably engaged with a cross frame member of said base frame.

5. The manure spreader of claim 4, wherein said floor mounting means further comprises an end cap for retaining the forward ends of said floor boards, said end cap having a portion thereof forming a pocket for slidably receiving the forward ends of said floor boards.

6. The manure spreader of claim 5, further comprising fasteners for securely fastening said floor boards to another cross frame member of said base frame intermediate the forward and rearward ends thereof.

7. The manure spreader of claim 1, wherein said means for moving manure comprises a conveyor having a plurality of slats extending transversely of said floor between a pair of spaced apart endless chains.

8. In a manure spreader having a box carried by a base frame for holding and transporting manure, said box having a floor made up of a plurality of individual boards with each floor board having a forward end and a rearward end, means for moving manure along said floor toward one end of said box, means disposed at said one end of said box for distributing manure onto a field, an arrangement comprising:
means mounting the forward and rearward ends of said floor boards to said base frame, said floor board mounting means permitting movement of the forward and rearward ends of said floor boards in generally horizontal directions while preventing movement of the forward and rearward ends of said floor boards in generally vertical directions, said floor board mounting means including clips fastened to the rearward ends of said floor boards for slidable engagement with said base frame.

9. The arrangement of claim 8, wherein said floor board mounting means further comprises an end cap slidably receiving the forward ends of said floor boards.

10. The arrangement of claim 8, further comprising fasteners securely fastening said floor boards to said base frame intermediate the forward and rearward ends thereof.

11. The arrangement of claim 8, further comprising:
an end cap slidably receiving the forward ends of said floor boards; and
fasteners securely fastening said floor boards to said base frame intermediate the forward and rearward ends thereof.

12. In a manure spreader having a box carried by a base frame for holding and transporting manure, said box having a floor made up of a plurality of individual boards with each floor board having a forward end and a rearward end, means for moving manure along said floor toward one end of said box, means disposed at said one end of said box for distributing manure onto a field, the improvement comprising:
clips fastened to the rearward ends of said floor boards for slidable engagement with said base frame;
an end cap slidably receiving the forward ends of said floor boards; and
fasteners securely fastening said floor boards to said base frame intermediate the forward and rearward ends thereof, whereby said floor boards are permitted movement of the forward and rearward ends thereof in generally horizontal directions while being restricted from movement of the forward and rearward ends of said floor boards in generally vertical directions.

* * * * *